Nov. 17, 1970   F. KVASNICKA   3,540,332
LATHE TOOLHOLDERS

Filed April 29, 1968   4 Sheets-Sheet 1

INVENTOR.
FRANK KVASNICKA
BY
his ATTORNEYS

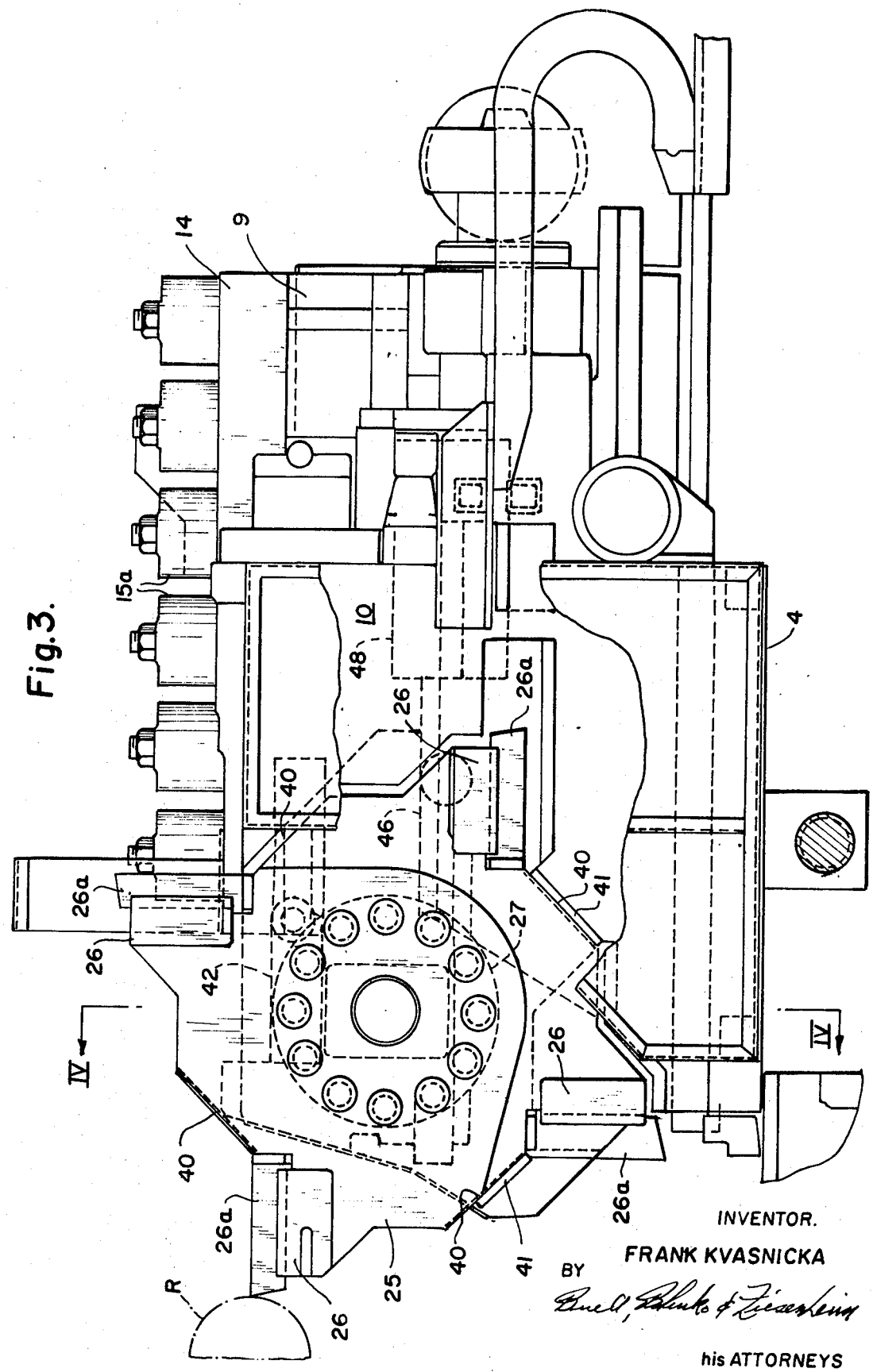

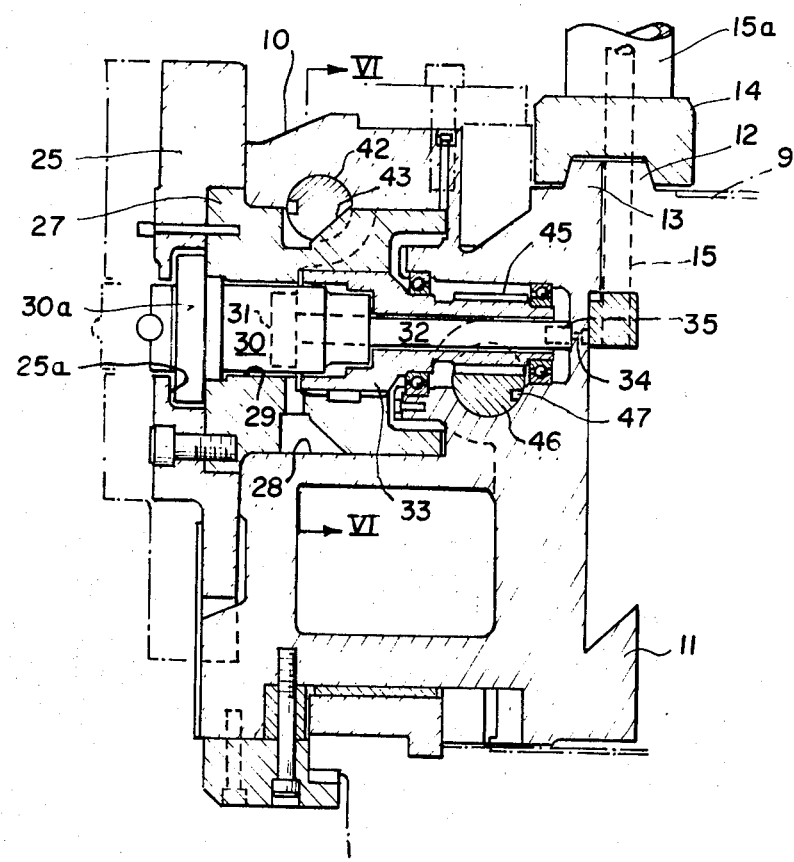
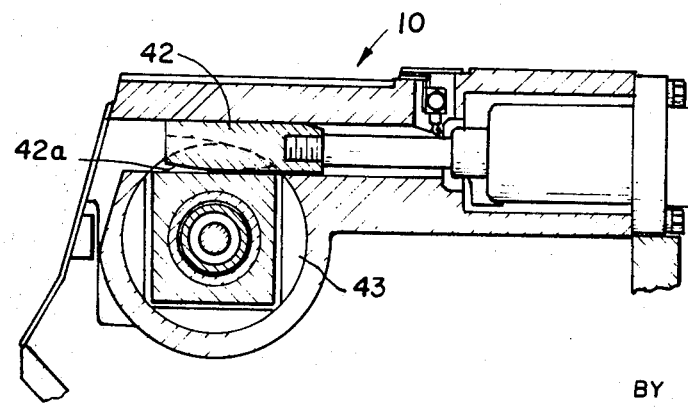

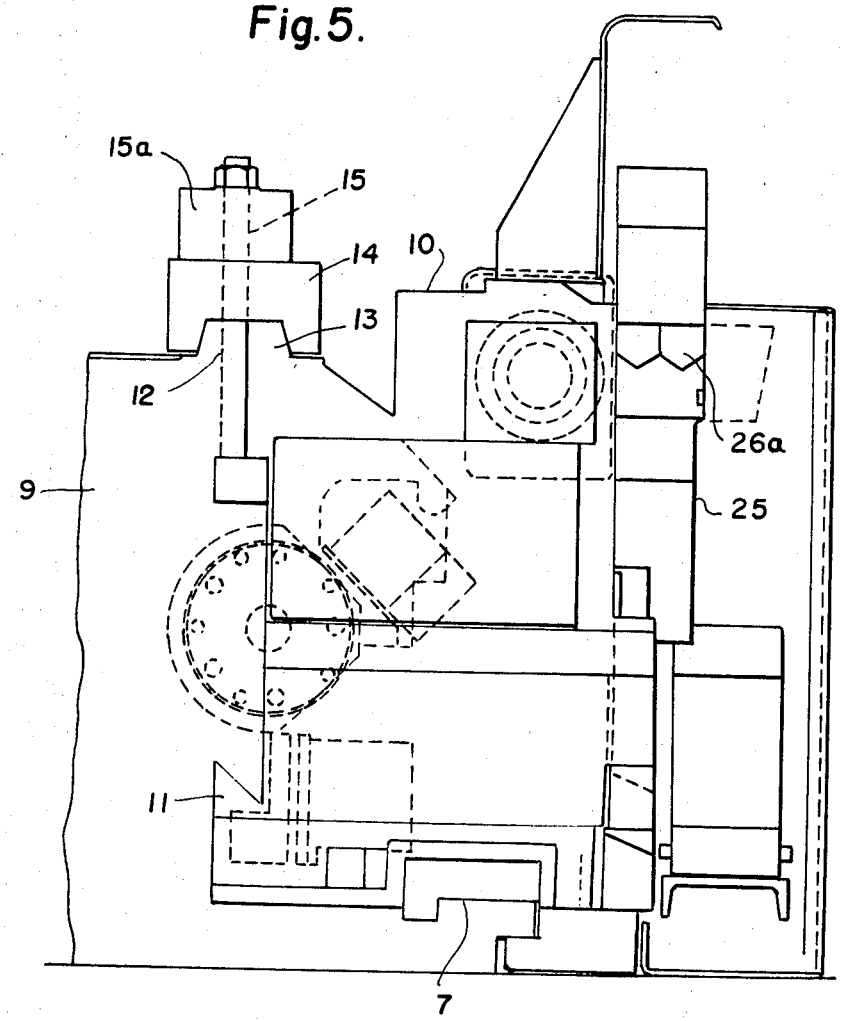

United States Patent Office 3,540,332
Patented Nov. 17, 1970

3,540,332
LATHE TOOLHOLDERS
Frank Kvasnicka, Mount Lebanon, Pa., assignor to Blaw-Knox Company, Pittsburgh, Pa., a corporation of Delaware
Filed Apr. 29, 1968, Ser. No. 724,872
Int. Cl. B23b 29/30
U.S. Cl. 82—36                                12 Claims

ABSTRACT OF THE DISCLOSURE

A lathe toolholder is provided with a turret rotatable in a vertical plane about a horizontal axis to a plurality of work positions and supported at each work position by removable holding means.

---

This invention relates to a lathe toolholder and particularly to a vertical turret type lathe toolholder which provides a markedly increased efficiency and strength. The lathe toolholder of this invention provides for optimum speed in changing tools while at the same time effectively reducing the cantilever effect between the toolholder and the work, thereby minimizing chattering and promoting cutting speed and precision of machining.

My lathe toolholder, while of general application, is particularly well adapted for the turning of large and heavy work such as rolling mill rolls in which a large difference in the diameters of the portion of the work being turned exists. For example, a rolling mill roll may have a roll body of as much as thirty-six to forty-eight inches in diameter while the roll necks may be of the order of ten to fifteen inches in diameter. The carriage upon which the toolholder is mounted and which traverses the lathe bed longitudinally is disposed to clear the roll body so that when the roll necks are being turned down the toolholder projects a considerable distance in cantilever fashion from the carriage.

In the past, turret toolholders have been used in connection with roll turning lathes, however, such holders have been mounted on a vertical axis shaft which is raised to permit rotation of one tool to another and lowered to bring the desired tool into position on a cantilevered support bed. Such a toolholder arrangement is shown in Johnson et al. Pat. No. 3,316,784. In such arrangements there is no real means for transferring the load to the body of the lathe and the load is primarily carried in the turret shaft itself. This markedly reduces the speed at which the lathe can be operated and the depth of cut which can be handled without excessive chattering, and inaccuracy in machining.

I provide a massive cross slide on the lathe carriage adjustably positionable transversely of the carriage and a tool post mounted on the cross slide and adjustably positioned thereon, a turret mounted on a horizontal axis on said tool post, support means on the tool post engaging the turret at spaced apart radial points thereon, means on the tool post for disengaging the turret from the support means and means on the tool post for rotating said turret in a vertical plane about its axis.

Preferably the turret is mounted on a double acting fluid cylinder which permits movement horizontally along its axis. The support means on the tool post are preferably integral seats or pads slidably engaging cooperating seats or pads on the turret.

Locking means in the tool post, releasably engaging the turret, is preferably provided to lock the turret in position on the seats.

I have set out certain objects, purposes and advantages of my invention in the foregoing general description. Other objects, purposes and advantages will be apparent from a consideration of the following description and the accompanying drawings in which:

FIG. 3 is a vertical transverse section on the line III—III of FIG. 1;

FIG. 4 is a vertical section on the line IV—IV of FIG. 3;

FIG. 5 is an enlarged fragmentary side elevation of the cross slide arrangement viewed from the left of FIG. 3; and FIG. 6 is a section on the line VI—VI of FIG. 4.

Figure 2:
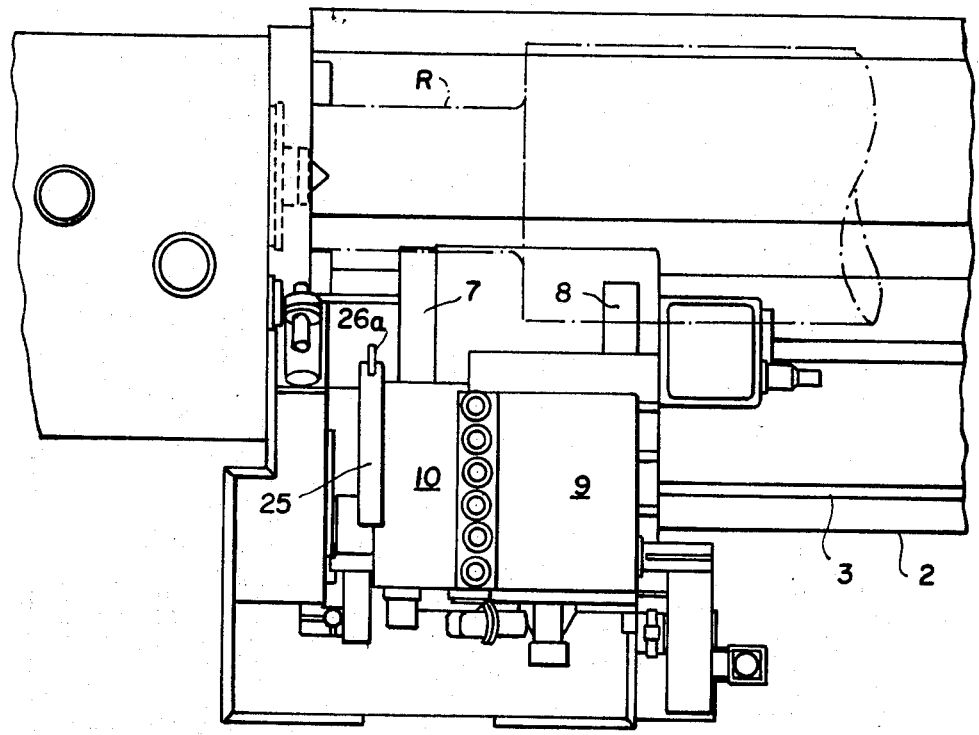
FIG. 2 is a diagrammatic plan view of the structure shown in FIG. 1.

Referring now more particularly to the drawings, the lathe has a bed carriage and tool post with cross slides and feed screws which are generally as shown in Johnson et al. Pat. No. 3,316,784. Such parts as are identical with like parts in Johnson et al. Pat. No. 3,316,784 will be given like numbers. The bed of the lathe is designated generally by reference numeral 2 having longitudinal ways 3 supporting and guiding a carriage 4 which is moved longitudinally along the ways 3 by a screw threaded through a nut fixedly mounted in the carriage 4. The lathe bed and the portion of the carriage cooperating therewith and the means for moving the carriage longitudinally of the lathe bed may be conventional as in Pat. No. 3,316,784.

Figure 1:
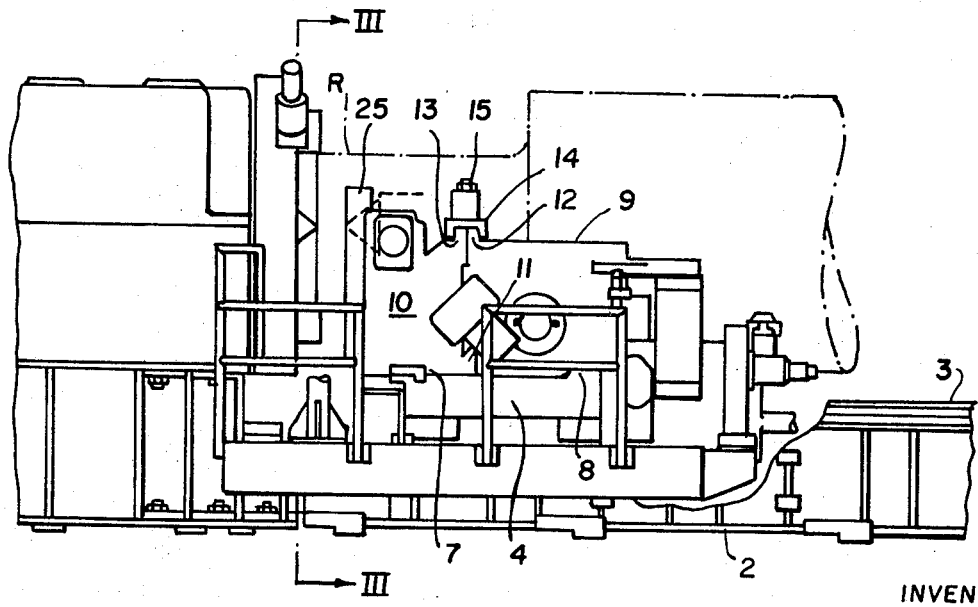
FIG. 1 is a diagrammatic side elevational view of a portion of a lathe having my improved toolholder applied thereto and showing the relationship of the toolholder to the work.

The carriage 4 has spaced apart transversely extending infeedways 7 and 8 respectively. Mounted for transverse movement guided by the infeedway 8 is a cross slide 9. Mounted for transverse movement guided by the infeedway 7 is a tool post 10. The tool past 10 and turret mounted thereon together constitute my improved toolholder. The tool post 10 is braced against the cross slide 9 and has a portion 11 interfitting with the cross slide as shown in FIGS. 1, 4 and 5. The upper portions of the cross slide 9 and the tool post 10 have opposed upward projections 12 and 13 respectively each with a downwardly and outwardly inclined outer face, and a holding member 14 as shown in cross section in FIGS. 1, 4 and 5 is applied thereto and fastened to the tool post 10 by draw bolts 15 fixed in cross slide 9 and extending through a hydraulic cylinder 15a adapted to bias the holding member 14 toward the projections 12 and 13. This provides a quick release for the cross slide and tool post. The threaded draw bolts and nuts of Pat. No. 3,316,784 could, of course, be substituted herein. Thus, although the cross slide and tool post are movable individually relatively to the carriage and to each other the cross slide and tool post effectively constitute a unitary toolholder which is extensible toward the work by advancing the tool post relatively to the cross slide. The cross slide may be advanced part way toward the work and the tool post may then be adjustably positioned relatively to the cross slide to bring the tool into operative engagement with the work. During relative movement of the tool post and cross slide the holding member may be loosened or released by loosening the draw bolts 15 by moving cylinder 15a, although the parts may be precision machined so that loosening of the holding member when the tool post is to be moved relatively to the cross slide may not be necessary.

The carriage 4 has an upstanding mounting portion or plate which extends generally parallel to the length of the lathe in which is mounted a nut through which passes a cross feed screw for the cross slide 9, the screw being in threaded engagement with the nut. Means such as a crank or motor (not shown) drive a shaft which through gearing turns the screw to move the cross slide 9 transversely of the carriage 4 or toward and away from the work all as shown in Pat. No. 3,316,784.

The cross slide 9 has a protruding portion in which is journalled for rotation a screw having a drive gear and motor at its outer end, the screw passing through and threadedly engaging a nut fixedly mounted in the tool post 10. Thus, the tool post may be moved relatively to the cross slide, all as described in Pat. No. 3,316,784.

In the structure shown in the drawings the tool post 10 is illustrated as having a turret 25 having four spaced apart tool bars 26 spaced radially from the axis of the turret. The turret 25 is fixed on a generally cylindrical turret slide 27 slidably mounted in a horizontal bore 28 in the tool post 10. The turret slide 27 is provided with a central bore 29 carrying a fluid cylinder 30 having a piston 31 on a piston rod 32 extending through drive shaft 33 which is keyed to the interior of turret slide 27. The cylinder 30 is provided with a collar 30a fitting within a groove 25a in turret 25. Fluid is introduced into cylinder 30 through lines 34 and 35 passing through rod 32.

The turret 25 is provided with pads 40 between each tool bar and adapted to engage seats 41 on the tool post to hold the turret against rotational movement when in the cutting position. A locking pin 42 having a tapered surface 42a is provided in the tool post acting against a conical shoulder 43 on the turret slide to lock the turret in cutting position. This arrangement of seats 41 and pads 40 provides a positive and definite positioning of the turret and each tool relative to the workpiece, independently of the shaft 30 so that each work position of the tool is firmly and uniformly fixed.

The drive shaft 33 is provided with a pinion 45 engaging a sliding rack 46 keyed by key 47 to the cross slide to selectively rotate the turret to its several positions. The rack 46 is operated by a hydraulic cylinder 48 fixed in the cross slide.

The turret is positioned by feeding fluid through line 34 into the cylinder on the left side of piston 31 (viewing FIG. 4) to move the turret pads 40 away from engagement with seats 41.

The turret is rotated by moving rack 46 to rotate drive shaft 33 which acts through its keyed connection with turret slide 27 to rotate the turret to the desired position. At this point fluid is delivered through line 35 to the right hand side of piston 31 to force the turret slide to the right (viewing FIG. 4) thus bringing the turret into position with its pads 40 engaging seats 41 and the selected tool bar in cutting position. The locking pin 42 is forced into position and the turret is ready for cutting.

As shown in FIG. 3 the cross slide is advanced toward the work until it just clears the body of the roll R whereupon the tool post is advanced relatively to the cross slide to position the bits 26a to act on the roll neck. The cross slide and tool post together form a strong support for the tool bar minimizing cantilever effect and eliminating chattering with the result that the work can be done at optimum speed with a deep cut and the turning will be accomplished with a high degree of precision and work finish. At the same time the turret is held by the coaction of pads 40 and seats 41 so that the thrust on the tool is transferred directly to the tool post and not into the turret shaft. By these means the cantilever effect which has proven so difficult to control in ordinary turret lathes is effectively minimized.

The pads 40 and seats 41 are preferably fixed on two intersecting lines whose apex lies on the vertical centerline of he turret beneath the turret axis. This provides the maximum resistance to deformation and shifting in the turret. The power operated means for shifting the turret axially, for effecting rotary indexing and actuating said clamping means provide for very rapid changes in the tool and make it possible to have a completely automatic hydraulically operated tool in which a change can be made in a matter of seconds.

While I have illustrated and described a presently preferred embodiment of the invention, it is to be understood that this invention may be otherwise embodied within the scope of the following claims.

I claim:

1. In a lathe having a longitudinal guideway, a carriage movable along the guideway, and a tool mounting and anchoring assembly movably mounted on said carriage for adjustments transversely thereof, a tool-holding turret assembly on the first-mentioned assembly comprising a vertically disposed turret having a plurality of separate tool means carried radially outwardly thereon, means mounting said turret on the first-mentioned assembly for rotation in a generally vertical plane about a horizontal axis substantially in alignment with said guideway to bring a given tool into active working position, and abutment members supported by the first-mentioned assembly and engageable with radially outward sections of said turret, said sections of the turret and each said abutment member having complementary closely interlockable surfaces whereby the turret is locked against rotation, and means effecting relative movement between said abutment members and turret to effect disengagement and engagement thereof, said abutment members being positioned substantially in said vertical plane of said turret at locations to act, respectively, beneath a tool which is in active working position, and in direct opposition to the forces imposed thereon while in its active working position.

2. In a lathe according to claim 1, wherein said abutment members are seats fixedly provided in the first-mentioned assembly, and said means effecting relative movement comprise means for shifting the turret axially to bring same into position opposite said seats.

3. In a lathe according to claim 2, including wedge means operable between the first-mentioned assembly and the turret for effecting final, secure locking of the turret against said seats.

4. In a lathe according to claim 1, wherein said abutment members comprise centrally facing seats cradling the turret about the lower peripheral edges thereof, and thereby resisting rearward and downward components of force imposed on the active tool means.

5. A tool indexing turret assembly comprising a tool post, a vertically disposed turret having a plurality of separate tool means carried radially outwardly thereon, means mounting said turret on said tool post for rotary indexing in a vertical plane about a horizontal axis, said tool post having stationary seats radially engaging the periphery of said turret at locations in said vertical plane of said turret, and means for clamping said turret bodily against said seats at a location closely adjacent said vertical plane of said turret, said clamping means being releasable, and said turret being shiftable axially, to move the turret out of engagement with said seats to a second position wherein the turret is freely rotatable for indexing of said tool means, at least two said seats being located below and at opposite sides of said horizontal axis, to mutually define a bed cradling and securing the turret against motion when clamped therein.

6. A turret assembly according to claim 5, wherein said clamping means comprises a wedge engageable with said turret to force it against said seats.

7. A turret assembly according to claim 6, wherein said wedge also is adapted to force the turret against said tool post in an axial direction.

8. A turret assembly according to claim 5, including power-operated means for shifting said turret axially, for effecting said rotary indexing and for actuating said clamping means.

9. In a lathe, a longitudinal guideway, a carriage movable along the guideway, a cross slide mounted on the carriage adjustably positionable transversely of the carriage, a tool post mounted on the carriage and adjustably positionable transversely of the carriage, means for fastening the cross slide and tool post together in respective adjusted transverse positions on the carriage, a turret on said tool post having a plurality of spaced apart tool means thereon, said turret being rotatable in a vertical plane about a horizontal axis to each of a plurality of work positions holding means on the tool post removably engaging said turret at each of said work positions, and a fluid cylinder carrying said turret to move said turret horizontally on its axis into and out of engagement with the holding means, said fluid cylinder being carried in a cylindrical turret slide fixed to said turret and movable horizontally in a bore in said tool post.

10. In a lathe as claimed in claim 9, means including a rack and pinion for rotating said fluid cylinder and turret from one work position to another when the turret is out of engagement with the holding means.

11. In a lathe as claimed in claim 9, wherein said turret holding means includes a pair of seats radially engaging the periphery of the turret located below said horizontal axis to act beneath a tool which is in active working position and in direct opposition to the working tool forces.

12. In a lathe as claimed in claim 11, wherein said holding means includes means for clamping said turret bodily against said seats, said clamping means being releasable and comprising a wedge engageable with said turret to force it against said seats.

References Cited

UNITED STATES PATENTS

| | | | |
|---|---|---|---|
| 2,505,684 | 4/1950 | McClernon | 82—36.1 |
| 2,900,849 | 8/1959 | Hutchens et al. | 74—826 |
| 2,979,971 | 4/1961 | Darash | 82—36.1 |
| 3,191,470 | 6/1965 | Pabst et al. | 82—36.1 |

LEONIDAS VLACHOS, Primary Examiner

U.S. Cl. X.R.

29—35.5; 74—826